US012551848B2

(12) United States Patent
Lawal et al.

(10) Patent No.: US 12,551,848 B2
(45) Date of Patent: Feb. 17, 2026

(54) MULTI-STAGE PERMEATE GAP MEMBRANE DISTILLATION SYSTEM AND PROCESS

(71) Applicants: Saudi Arabian Oil Company, Dhahran (SA); King Fahd University of Petroleum & Minerals, Dhahran (SA)

(72) Inventors: Dahiru Umar Lawal, Dhahran (SA); Turki Nabieh Baroud, Dhahran (SA); Hasan Al Abdulgader, Dammam (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 613 days.

(21) Appl. No.: 17/892,380

(22) Filed: Aug. 22, 2022

(65) Prior Publication Data
US 2024/0058761 A1    Feb. 22, 2024

(51) Int. Cl.
*B01D 61/36* (2006.01)
*B01D 69/02* (2006.01)

(52) U.S. Cl.
CPC ....... *B01D 61/3641* (2022.08); *B01D 61/366* (2013.01); *B01D 69/02* (2013.01); *B01D 2313/221* (2022.08); *B01D 2313/26* (2013.01); *B01D 2313/54* (2013.01); *B01D 2317/025* (2013.01); *B01D 2317/04* (2013.01); *B01D 2317/06* (2013.01); *B01D 2325/38* (2013.01)

(58) Field of Classification Search
CPC .............. B01D 61/3641; B01D 61/366; B01D 2311/13; B01D 2317/02; B01D 2317/04
See application file for complete search history.

(56) References Cited

U.S. PATENT DOCUMENTS

| 3,878,054 A | 4/1975 | Rodgers |
| 10,392,270 B2 | 8/2019 | Swaminathan et al. |
| 11,345,619 B1 | 5/2022 | Lawal et al. |

(Continued)

FOREIGN PATENT DOCUMENTS

| JP | H09108547 | 4/1997 |
| WO | WO 2013151498 | 10/2013 |
| WO | WO 2015162314 | 10/2015 |

OTHER PUBLICATIONS

U.S. Appl. No. 17/892,269, Lawal et al., filed Aug. 22, 2022.

(Continued)

*Primary Examiner* — Bradley R Spies
(74) *Attorney, Agent, or Firm* — Fish & Richardson P.C.

(57) ABSTRACT

A method for purifying a liquid is described. A liquid feed is fed to a feed chamber. A carrier gas is fed through the liquid feed in the feed chamber to form a humidified carrier gas. A coolant is fed to a coolant chamber. The coolant chamber is separated from the feed chamber by a permeate gap chamber. The permeate gap chamber is separated from the feed chamber by a membrane that allows vapor to pass while blocking liquid flow across the membrane. The coolant chamber is separated from the permeate gap chamber by a thermally conductive plate. At least a portion of the vapor from the feed chamber that transported through the membrane is condensed by the coolant in the coolant chamber and the thermally conductive plate to form a first distillate. At least a portion of the humidified carrier gas is condensed to form a second distillate.

12 Claims, 13 Drawing Sheets

(56) References Cited

U.S. PATENT DOCUMENTS

| | | |
|---|---|---|
| 2004/0060808 A1 | 4/2004 | LaViolette |
| 2014/0305789 A1 | 10/2014 | Lowenstein |
| 2016/0074812 A1 | 3/2016 | Lienhard et al. |
| 2016/0107121 A1 | 4/2016 | Lienhard et al. |
| 2017/0361277 A1 | 12/2017 | Ghaffour et al. |
| 2019/0299164 A1 | 10/2019 | Khalifa |
| 2020/0095138 A1* | 3/2020 | Khalifa .......... B01D 5/003 |
| 2020/0109070 A1 | 4/2020 | Hashimoto et al. |
| 2021/0060492 A1 | 3/2021 | Klaehn et al. |
| 2021/0260531 A1 | 8/2021 | Falath et al. |
| 2022/0143553 A1 | 5/2022 | Lawal et al. |
| 2022/0144671 A1 | 5/2022 | Lawal et al. |

OTHER PUBLICATIONS

U.S. Appl. No. 17/892,284, Lawal et al., filed Aug. 22, 2022.
U.S. Appl. No. 17/892,306, Lawal et al., filed Aug. 22, 2022.
U.S. Appl. No. 17/892,347, Lawal et al., filed Aug. 22, 2022.
Alkhudhiri et al., "Air gap membrane distillation: a detailed study of high saline solution," Desalination, 2017, 403:179-186, 8 pages.
Alklaibi et al., "Transport analysis of air-gap membrane distillation," Journal of Membrane Science, 2005, 255(1):239-253, 15 pages.
Cao et al., "Seawater desalination based on a bubbling and vacuum-enhanced direct contact membrane distillation," International Journal of Chemical Engineering, Oct. 2021, 2021:3587057, 15 pages.
Chen et al., "Performance enhancement and scaling control with gas bubbling in direct membrane distillation," Desalination, Jan. 2013, 308:47-55, 9 pages.
Cui et al., "The use of gas bubbling to enhance membrane processes," Journal of Membrane Science, Aug. 2003, 221(1-2):1-35, 35 pages.
Essalhi et al., "Application of a porous composite hydrophobic/hydrophilic membrane in desalination by air gap and liquid gap membrane distillation: a comparative study," Separation Purification Technology, 2014, 133:176-186, 11 pages.
Francis et al., "Material gap membrane distillation: A new design for water vapor flux enhancement," Journal of Membrane Science, 2013, 448:240-247, 8 pages.
Gao et al., "Experimental study of hollow fiber permeate gap membrane distillation and its performance comparison with DCMD and SGMD," Separation and Purification Technology, Nov. 2017, 188:11-23, 13 pages.
Janajreh et al., "Numerical investigation of air gap membrane distillation (AGMD): Seeking optimal performance," Desalination, 2017, 424:122-130, 9 pages.
Jiang, "Separation of water out of highly concentrated electrolyte solutions using multistage vacuum membrane distillation," Masters of Science Thesis, LTH School of Industrial Engineeringand Management, 2013, 82 pages.

Khalifa et al., "Application of Response Surface and Taguchi Optimization Techniques to Air Gap Membrane Distillation for Water Desalination—A Comparative Study," Desalination and water treatment, 2016, 57(59):28513-28530, 19 pages.
Khalifa et al., "Experimental and theoretical investigation on water desalination using air gap membrane distillation," Desalination, 2015, 376:94-108, 15 pages.
Khalifa et al., "Flux enhanced water gap membrane distillation process-circulation of gap water," Separation and Purification Technology, 2020, 231:1-9, 9 pages.
Khalifa et al., "Performance and Optimization of Air Gap Membrane Distillation System for Water Desalination," Arabian Journal for Science and Engineering, 2015, 13 pages.
Khalifa et al., "Water and air gap membrane distillation for water desalination—An experimental comparative study," Separation and Purification Technology, 2015, 141:276-284, 9 pages.
Khalifa, "Performances of air gap and water gap MD desalination modules," Water Practice and Technology, 2018, 13 (1):200-209, 10 pages.
Lawal et al., "Experimental investigation of an air gap membrane distillation unit with double-sided cooling channel," Desalination and Water Treatment, 2015, 57(24), 16 pages.
Li et al., "Microporous polypropylene and polyethylene hollow fiber membranes. Part 3. Experimental studies on membrane distillation for desalination," Desalination, 2003, 155(2):153-156, 4 pages.
Liu et al., "Experimental study of the optimal vacuum pressure in vacuum assisted air gap membrane distillation process," Desalination, 2017, 414:63-72, 10 pages.
Mahmoudi et al., "A unique permeate gap membrane distillation system for combined fresh water and power production," Energy Procedia, Feb. 2019, 160:170-177, 8 pages.
Naidu et al., "Hybrid membrane distillation: Resource, nutrient and energy recovery," Journal of Membrane Science, 2020, 599:1-21, 21 pages.
Pan et al., "Experimental and Numerical Investigations on Gas Injection-Enhanced Air Gap Membrane Distillation for Water Desalination," Ind. Eng. Chem. Res. 2022, 61:1850-1862, American Chemical Society, 2022, 13 pages.
Riera, "Integrated solution for DWTP reverse osmosis brine management: CO2 stripping followed by membrane distillation," Master's Thesis for the degree of Master of Science in Technology, School of Chemical Technology, Aalto University, 2015, 92 pages.
Swaminathan et al., "Energy efficiency of permeate gap and novel conductive gap membrane distillation," Journal of Membrane Science, Sep. 2016, 502, 20 pages.
Khalifa et al., "Air gap and water gap multistage membrane distillation for water desalination," Desalination, Jul. 2018, 437:175-183, 9 pages (Abstract Only).
SAIP Examination Report in Saudi Arabian Appln. No. 123450199, dated Sep. 6, 2025, 18 pages (with English translation).

* cited by examiner

MULTI-STAGE PERMEATE GAP MEMBRANE DISTILLATION SYSTEM AND PROCESS

TECHNICAL FIELD

The present disclosure is directed to a multi-stage permeate gap membrane distillation system and process.

BACKGROUND

Membrane distillation is a separation process that is driven by phase change. A membrane provides a barrier for a liquid phase while allowing a vapor phase to pass through. Membrane distillation can be used, for example, in water treatment. Several membrane distillation methods exist. Some examples include direct contact membrane distillation, air gap membrane distillation, vacuum membrane distillation, sweeping gas membrane distillation, vacuum multi-effect membrane distillation, and permeate gap membrane distillation.

The existing conventional membrane distillation systems are typically not efficient enough to be commercially feasible. Therefore, research has continued into the development of membrane distillation systems with a high rate of water permeate flux, reduced energy consumption, and efficient membrane fouling control.

SUMMARY

Certain aspects of the subject matter described can be implemented as a multistage permeate gap membrane distillation (MS-PGMD) system that includes multiple modules. Each module includes a feed chamber, a coolant chamber, a permeate gap chamber, a membrane, and a thermally conductive plate. The feed chamber of each module is coupled to a feed line and a carrier gas line. The feed line introduces a liquid feed into the feed chamber of each module from a liquid feed tank. The carrier gas line introduces a carrier gas into the feed chamber of each module. The coolant chamber of each module is coupled to a coolant line. The coolant line introduces a coolant into the coolant chamber of each module from a coolant feed tank. The permeate gap chamber of each module is intermediate of the feed chamber and the coolant chamber of the respective module. The permeate gap chamber of each module is substantially filled with a liquid that includes water. The membrane of each module separates the feed chamber from the permeate gap chamber of the respective module. The membrane of each module allows transportation of vapor from the feed chamber to the permeate gap chamber of the respective module while blocking liquid from moving from the feed chamber to the permeate gap chamber of the respective module. The thermally conductive plate of each module separates the coolant chamber from the permeate gap chamber of the respective module. The thermally conductive plate of each module and the coolant within the coolant chamber of the respective module are cooperatively configured to condense at least a portion of the vapor from the feed chamber that transported through the membrane of the respective module to form a distillate.

This, and other aspects, can include one or more of the following features. In some embodiments, the MS-PGMD system includes a condenser that is fluidically coupled to the feed chamber of each module. In some embodiments, the condenser is configured to condense at least a portion of a vapor exiting the feed chamber of each module to form a second distillate. In some embodiments, the MS-PGMD system includes a carrier gas outlet line that fluidically couples a carrier gas outlet on the feed chamber of each module to the condenser. In some embodiments, the modules are coupled in parallel to the feed line, the carrier gas line, and the coolant line. In some embodiments, the modules are fluidically coupled in series to the liquid feed. In some embodiments, a liquid inlet to the feed chamber of a first module in the series is fluidically coupled to the feed line, a liquid outlet of the feed chamber of a last module in the series is fluidically coupled to a feed return line, and each intervening module between the first module and the last module is fluidically coupled by a line from a liquid outlet on the feed chamber of the intervening module to a liquid inlet on the feed chamber of the next module. In some embodiments, the modules are fluidically coupled in series to the coolant. In some embodiments, a coolant inlet to the coolant chamber of a first module in the series is fluidically coupled to the coolant line, a coolant outlet of the coolant chamber of a last module in the series is fluidically coupled to a coolant return line, and each intervening module between the first module and the last module is fluidically coupled by a line from a coolant outlet of the coolant chamber of the intervening module to a coolant inlet of the coolant chamber of the next module. In some embodiments, the modules are fluidically coupled in series to the carrier gas. In some embodiments, a carrier gas inlet to the feed chamber of a first module in the series is fluidically coupled to the carrier gas line, a carrier gas outlet of the feed chamber of a last module in the series is fluidically coupled to a carrier gas outlet line, and each intervening module between the first module and the last module is fluidically coupled by a line from a carrier gas outlet of the feed chamber of the intervening module to a carrier gas inlet of the feed chamber of the next module. In some embodiments, the MS-PGMD system includes a heating element coupled to the liquid feed tank. In some embodiments, the MS-PGMD system includes a heat exchanger coupled to the feed line. In some embodiments, the MS-PGMD system includes a heating element coupled to the feed chamber of at least one of the modules. In some embodiments, the MS-PGMD system includes a heating element coupled to the carrier gas line. In some embodiments, the liquid feed includes an aqueous solution. In some embodiments, the liquid feed includes a liquid including a dissolved salt, a mixture of salts, a salt and an organic contaminant mixture, or a salt and an inorganic contaminant mixture, or any combinations thereof. In some embodiments, the liquid feed includes seawater, industrial wastewater, brackish water, produced water, fruit juice, blood, milk, dye, hazardous wastewater, or a brine solution, or any combinations thereof. In some embodiments, the membrane includes a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane, or any combinations thereof. In some embodiments, the membrane includes a reinforced hollow tube, a non-reinforced hollow tube, a spiral wound, a flat sheet, or a non-flat sheet, or any combinations thereof. In some embodiments, a contact angle of a condensed droplet on the membrane is greater than 90° (degrees). In some embodiments, the carrier gas includes air, nitrogen, helium, argon, or carbon dioxide, or any combinations thereof.

Certain aspects of the subject matter described can be implemented as a method for purifying a liquid using a multi-stage permeate gap membrane distillation (MS-PGMD) system. A liquid feed is fed to a feed chamber in each of multiple modules. The liquid feed in the feed chamber of each module is at a temperature of greater than about 50 degrees Celsius (° C.). A carrier gas is fed through the liquid feed in the feed chamber of each module to form a humidified carrier gas. A coolant is fed to a coolant chamber in each module. The coolant chamber in each module is separated from the feed chamber in each module by a permeate gap chamber that is substantially filled with a liquid that includes water. The permeate gap chamber in each module is separated from the feed chamber in each module by a membrane that allows vapor to pass across the membrane while blocking liquid flow across the membrane. The coolant chamber in each module is separated from the permeate gap chamber in each module by a thermally conductive plate. At least a portion of the vapor from the feed chamber in each module that transported through the membrane of the respective module is condensed by the coolant in the coolant chamber and the thermally conductive plate of each module to form a first distillate. At least a portion of the humidified carrier gas is condensed to form a second distillate.

This, and other aspects, can include one or more of the following features. In some embodiments, the liquid feed in the feed chamber of each module is at a temperature in a range of from about 50° C. to about 100° C. In some embodiments, the liquid feed is heated before the liquid feed is fed to the feed chamber of each module. In some embodiments, the liquid feed is heated in the feed chamber of at least one of the modules. In some embodiments, the liquid feed is fed to the feed chamber of a first module, and then the liquid feed exiting the feed chamber of the first module is fed to the feed chamber of a second module. In some embodiments, the coolant is fed to the coolant chamber of a first module, and then the coolant exiting the coolant chamber of the first module is fed to the coolant chamber of a second module. In some embodiments, the carrier gas is fed to the feed chamber of a first module, and then the carrier gas exiting the feed chamber of the first module is fed to the feed chamber of a second module.

DETAILED DESCRIPTION

Figure 1A:
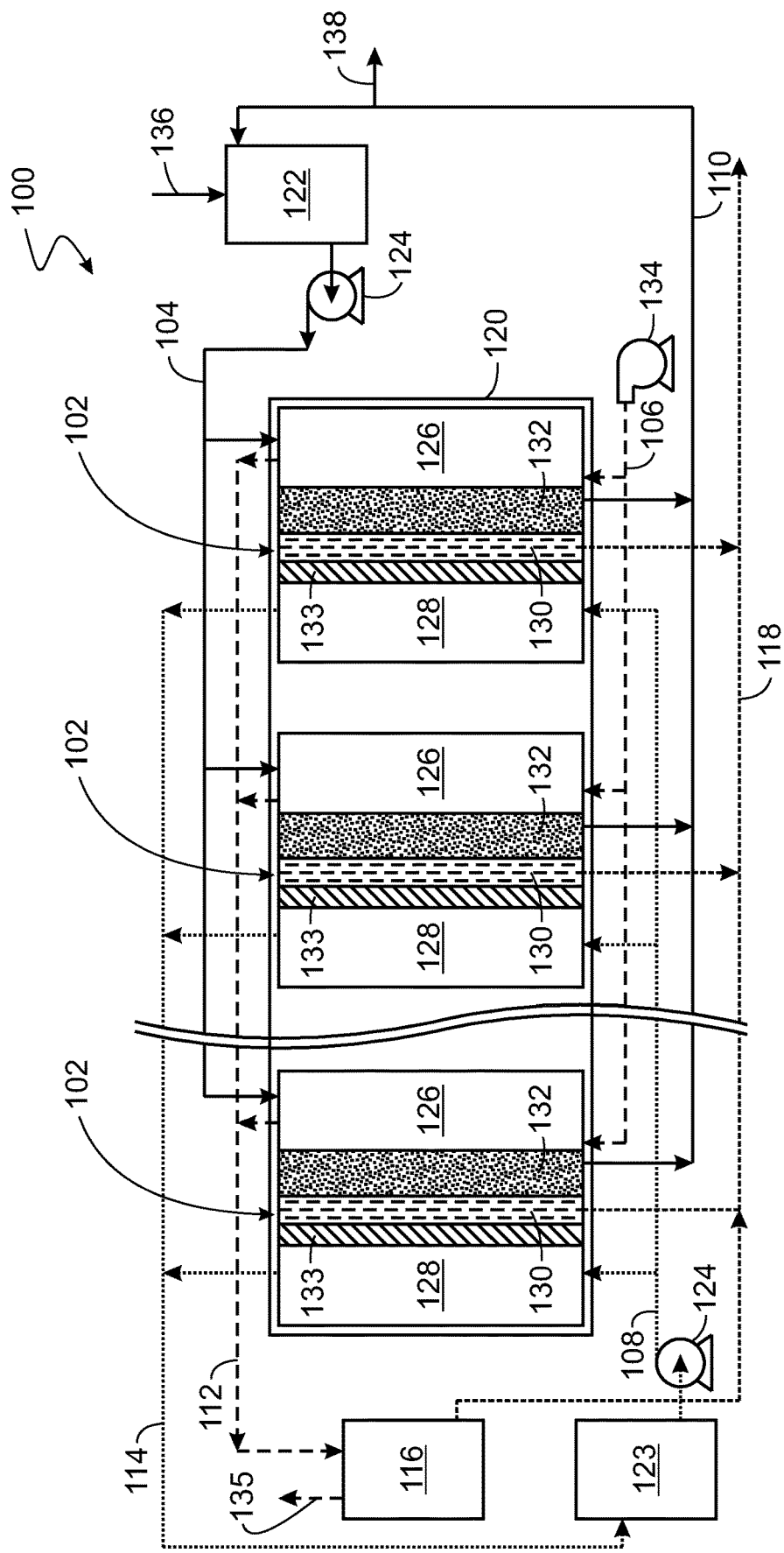
FIG. 1A is a simplified process flow diagram of a multi-stage permeate gap membrane distillation (MS-PGMD) system including a number of modules and an external condenser, in which each of the modules is fluidly connected in parallel to a feed line, a carrier gas line, and a coolant line.

Membrane distillation (MD) is a combined thermal and membrane-based separation process, which allows vapor permeation across a membrane and prevents liquid penetration. The MD separation process is commonly applied in water desalination by separating water vapor from a brine stream using a micro- or nano-porous membrane, depending on the pore size desired. The feed stream received by the feed side of the MD is usually heated to encourage evaporation, while the temperature of the coolant stream received by the coolant side of the MD is usually kept lower than that of the feed stream temperature to encourage condensation. The driving force for water vapor permeation across the membrane is the vapor pressure difference. The vapor pressure difference is often induced by the temperature gradient across the membrane. Membrane distillation can be performed at a low feed temperature (usually less than 100° C.) and can be operated by renewable energy and low-grade energy sources, such as solar energy, wind energy, geothermal energy, and waste heat.

Four types of membrane distillation modules exist in four configurations that include sweeping gas membrane distillation (SGMD), vacuum membrane distillation (VMD), direct contact membrane distillation (DCMD) and air gap membrane distillation (AGMD). These MD configurations is operated by the same principle (vapor generation, vapor permeation across membrane and vapor condensation). The differences among these configurations lie in the design of their condensation chambers, while the feed side of the modules typically remain the same for all configurations. While the direct contact membrane distillation system yields high permeate flux, it is characterized by high conductive heat loss and high temperature polarization effect. Permeate contamination is possible in DCMD. AGMD is characterized by low conductive heat loss and low temperature polarization effect. Permeate gap membrane distillation (PGMD) is a type of MD configuration with an enhanced permeate flux in comparison to AGMD. PGMD is sometimes referred to as liquid gap membrane distillation (LGMD) or water gap membrane distillation (WGMD). In PGMD, the stagnant air in the distillate chamber of an AGMD is replaced with a liquid, such as distilled water or deionized water. In PGMD, vapor from the feed stream permeates across the membrane pores and condenses at the interface between the permeate side of the membrane and the water in the distillate zone.

An MS-PGMD system and a process for using the MS-PGMD are provided herein. The MS-PGMD system includes multiple cells or modules. Each of the modules includes a feed chamber in which a liquid feed to be treated is fed, and a coolant chamber through which a coolant is circulated. Each of the modules includes a permeate gap chamber intermediate of the feed chamber and the coolant chamber. A vapor permeable, liquid impervious membrane separates the feed chamber from the permeate gap chamber. The membrane allows a component of the liquid to pass in the form of vapor. A carrier gas is bubbled and humidified through the feed chamber of each of the modules and is condensed in an external condenser outside of the module, producing a purified liquid and a concentrated feed solution. Fouling of the membrane is controlled and a water flux is improved by bubbling a carrier gas through the feed chamber of each of the modules. A thermally conductive plate separates the coolant chamber from the permeate gap chamber. The coolant in the coolant chamber and the thermally conductive plate cooperate to condense at least a portion of the vapor that has flowed from the feed chamber through the membrane and into the permeate gap chamber. The condensate is a distillate (purified liquid). In some embodiments, the distillate formed within the permeate gap chamber is combined with the purified liquid produced by the external condenser.

The subject matter described in this disclosure is generally directed to a multi-stage permeate gap membrane distillation (MS-PGMD) system that includes multiple modules for bubbling a carrier gas through a liquid feed to separate and condense a distillate. The subject matter described in this disclosure can be implemented, for example, in desalination, waste treatment, food, and medical applications. The subject matter described in this disclosure can be implemented in particular embodiments, so as to realize one or more of the following advantages. Bubbling a carrier gas through the liquid feed can induce turbulent dissipation in the feed chamber of the modules, thereby promoting mass and heat transfer within the feed chamber of the modules and enhancing vapor generation in the liquid feed. For example, flowing the carrier gas through the liquid feed in the feed chamber of each module can increase the mass transfer coefficient of the feed chamber. The turbulent dissipation rate in the liquid feed in the feed chamber of each module can thus be increased, which can increase the rate of vapor permeation through the membrane. The carrier gas bubbling through the liquid feed can become humidified and saturated with vapor from the liquid feed. This vapor can be subsequently condensed, for example, by an external condenser (external to the modules) to generate additional distillate, thereby enhancing the productivity of the system. The carrier gas bubbling through the liquid feed can remove scaling and/or fouling from surface(s) of the modules and/or from the pores of the membrane material, thereby extending the operating life of the membranes and/or modules and reducing costs associated with replacing and/or performing maintenance on the membranes and/or modules.

FIG. 1A is a simplified process flow diagram of a MS-PGMD system 100 including a number of modules 102, in which each of the modules 102 is fluidly connected in parallel to a feed line 104, a carrier gas line 106, and a coolant line 108. Each of the modules 102 are also connected in parallel to a feed return line 110, a carrier gas outlet line 112, and a coolant outlet line 114. In this embodiment, an external condenser 116 is used to condense a fluid from the vapor flow in the carrier gas outlet line 112. The fluid, such as purified water, is removed from the MS-VMD system 100 through a distillate outlet 118. In the embodiment shown in FIG. 1A, the modules 102 are contained in a housing 120. In other embodiments, the modules 102 may be stand-alone units in individual housings. In some embodiments, a base set of modules 102 are enclosed in the housing 120, and additional modules 102 in individual housings are added to increase the capacity of the MS-PGMD system 100.

The feed line 104 provides a liquid feed to each of the modules 102 from a liquid feed tank 122, for example, by a pump 124. In some embodiments, the liquid feed tank 122 is heated, for example, by a heating element coupled to the liquid feed tank 122 and/or by a heat exchanger on the feed line 104, to provide a hot liquid feed in the feed line 104. In other embodiments, a heating element is coupled to the feed chamber 126 of each module 102. A combination of both heating methods can be used. In some embodiments, the liquid feed is heated to a temperature of up to about 100 degrees Celsius (° C.). In some embodiments, the liquid feed is heated to a temperature in a range of from about 50° C. to about 100° C.

In some embodiments, the feed liquid in the feed chamber 126 is statically processed by filling and closing valves on the inlet points from the feed line 104 and outlet points from the feed chamber 126 to the feed return line 110. Alternatively, the feed liquid can be dynamically added to the feed chamber 126 from the feed line 104 under the flow of gravity by mounting of the liquid feed tank 122 higher than the modules 102, then partially opening the inlet points from the feed line 104 and outlet points from the feed chamber 126 to the feed return line 110. As mentioned herein, the liquid feed can also be pumped through the feed chamber 126 using a pump 124. In some embodiments, the pump 124 is variable and a control system is used to reach a desired flowrate, for example, sufficient to keep the feed chamber 126 liquid full.

The liquid feed provided from the liquid feed tank 122 can be an aqueous solution, for example, seawater, industrial wastewater, brackish water, produced water, fruit juice, blood, milk, dye, hazardous wastewater, brine solution, non-condensable gas, non-potable water, or any liquid including a dissolved salt, for example, a mixture of salts, a salt and organic contaminant mixture, a salt and inorganic contaminant mixture, or a combination of these.

The condenser 116 can create some vacuum by condensing the distillate outlet 118 from the vapor in the humidified gas in the carrier gas outlet line 112. Non-condensable gases can vent from the condenser 116 through a vent line 135. The carrier gas may include nitrogen, air, helium, argon, carbon dioxide, and the like. In some embodiments, different carrier gases may be used in different modules 102. For example, compressed air may be used in upstream modules 102, while dry air is used in modules 102 that are downstream to increase the removal of water.

The carrier gas can be supplied to the carrier gas line 106 from a device such as a blower 134, compressor, gas tank, gas line, or the like. After exiting through the vent line 135, the carrier gas may be recycled in the process, for example, by pass through a dryer and returned to the blower 134. The carrier gas may be injected to the feed chamber 126 at ambient conditions or may be heated prior to injection to feed chamber 126. In various embodiments, the injection into the feed chamber 126 is from a single point injector or a multiple point injector, such as a sparger or orifice coupled to the carrier gas line 106.

The heat source for the MS-PGMD system 100 can be from renewable energy sources, low-grade energy sources, electrical energy, waste heat from other thermal processes, or their combinations. As described herein, the heat can be applied to the liquid feed in the liquid feed tank 122, a heater in the feed chamber 126, or both.

The coolant line 108 provides a coolant to each of the modules 102 from a coolant tank 123, for example, by a pump 125. In some embodiments, the coolant in the coolant chamber 128 is statically processed by filling and closing valves on the inlet points from the coolant line 108 and outlet points from the coolant chamber 128 to the coolant outlet line 114. Alternatively, the coolant can be dynamically added to the coolant chamber 128 from the coolant line 108 under the flow of gravity by mounting of the coolant tank 123 higher than the modules 102, then partially opening the inlet points from the coolant line 108 and outlet points from the coolant chamber 128 to the coolant outlet line 114. As mentioned herein, the coolant can also be pumped through the coolant chamber 128 using the pump 125. In some embodiments, the pump 125 is variable and a control system is used to reach a desired flowrate, for example, sufficient to keep the coolant chamber 128 liquid full. The coolant provided from the coolant tank 123 can include water, air, oil, or a combination of these. In some embodiments, the coolant includes a fluid other than water, air, or oil. In some embodiments, the coolant includes a liquid including a dissolved salt, for example, a mixture of salts, a salt and organic contaminant mixture, a salt and inorganic contaminant mixture, or a combination of these.

The feed chamber 126 is separated from the coolant chamber 128 by a permeate gap chamber 130. The permeate gap chamber 130 is intermediate of the feed chamber 126 and the coolant chamber 128. The permeate gap chamber 130 is substantially filled with a liquid. In some embodiments, the permeate gap chamber 130 is substantially filled with a liquid including water. For example, the permeate gap chamber 130 can be substantially filled with pure water, distilled water, or deionized water. In some embodiments, the permeate gap chamber 130 is substantially filled with a pure liquid other than water. In some embodiments, the width of the permeate gap chamber 130 is in a range of from about 0.05 millimeters (mm) to 200 mm. In some embodiments, the permeate gap chamber 130 is a fixed gap chamber. For example, the width of the permeate gap chamber 130 is uniform. In some embodiments, the permeate gap chamber 130 is a variable gap chamber. For example, the width of the permeate gap compartment 130 is non-uniform.

A membrane 132 separates the feed chamber 126 from the permeate gap chamber 130. In various embodiments, the membrane 132 in each of the modules 102 is a reinforced hollow tube, a non-reinforced hollow tube, a spiral wound tube, a flat sheet, or a non-flat sheet. The membrane 132 includes multiple pores that are sized to allow water vapor originating from the hot liquid to pass from the feed chamber 126 through the membrane 132 to the permeate gap chamber 130. The membrane 132 prevents liquid flow between the feed chamber 126 and the permeate gap chamber 130. In various embodiments, the membrane 132 is a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane. In some embodiments, the membrane 132 includes a support layer and an active layer. The membrane 132 can be made, for example, from a porous material, such as a ceramic. In some embodiments, a contact angle of the liquid on the membrane 132 is greater than 90 degrees (°). In some embodiments, a different material is be used for the membrane 132 different modules 102. For example, the membrane 132 used in modules 102 that are upstream may have smaller effective pore sizes as more vapor may be released from more dilute liquid, while downstream modules 102 may have larger effective pore sizes as the more concentrated liquid may release less vapor.

A thermally conductive plate 133 separates the coolant chamber 128 from the permeate gap chamber 130. The thermally conductive plate 133 and the coolant in the coolant chamber 128 are cooperatively configured to condense at least a portion of the vapor (from the feed chamber 126 that passed through the membrane 132) in the permeate gap chamber 130 to form a distillate (purified liquid). In some embodiments, the thermally conductive plate 133 is in the form of a thin, metallic plate or a thin, polymeric plate. In some embodiments, the thermally conductive plate 133 is in the form of thin, metallic tubes or thin, polymeric tubes. The thermally conductive plate 133 can be made, for example, from metallic material, composite material, carbon fibers, carbon nanotubes, or sapphire. The distillate formed in the permeate gap chamber 130 is discharged from the module 102 via a distillate outlet of the permeate gap chamber 130. The distillate from the permeate gap chamber 130 has a water purity level that is greater than a water purity level of the liquid feed entering the feed chamber 126.

As the vapor from the carrier gas outlet line 112 is condensed in the condenser 116 to form additional distillate, make-up liquid is added to the liquid feed tank 122 through a make-up line 136. As the liquid feed is concentrated in the process, it may reach a point at which it is too concentrated for effective separation. Accordingly, a portion of the liquid feed may be removed from a drain line 138, for example, coupled to the feed return line 110, to allow dilution of the liquid feed with fresh liquid added through the make-up line 136.

In some embodiments, the condenser 116 includes thin metallic tubes or thin polymeric tubes. The condenser 116 can be made, for example, from a metallic material, a composite material, or carbon fibers, among others. As described herein, the condensed water from the condenser 116 is removed through the distillate outlet 118. The distillate from the distillate outlet 118 can have a water purity level that is greater than a water purity level of the liquid feed from the liquid feed tank 122.

The modules 102, including the chambers (126, 128, 130), the membrane 132, and the thermally conductive plate 133, of the MS-PGMD system 100 may be of any shape, such as rectangular, triangular, square, circular, cylindrical, hexagonal, or spherical. The housing 120 can be made, for example, from metallic material, polymeric material, composite material, carbon fiber, carbon nanotube, or sapphire.

In some embodiments, the housing 120 is made of steel, brass, copper, high-density polyethylene (HDPE), acrylic, or polyvinyl chloride (PVC).

In some embodiments, the housing 120 includes a frame, support, gasket, or a combination of these, which can provide structural support, for the chambers 126, 128, and 130 of the modules 102, hold the membrane 132 between the chambers 126 and 130, and hold the thermally conductive plate 133 between the chambers 128 and 130. The supporting structure can be made of a material that is non-corrosive and chemically inert in relation to the liquid feed. In various embodiments, the housing 120 is made, for example, from a metallic material, a polymeric material, a composite material, or carbon fibers, among others.

As described herein, the MS-PGMD system 100 removes a distillate (such as water) as vapor from the liquid feed using two different techniques. Vapor is entrained in the carrier gas after it is bubbled through the liquid feed in the feed chamber 126. Further, vapor is transported across the membrane pores from the feed chamber 126 to the permeate gap chamber 130. The driving force for mass/vapor transfer across the pores of the membranes is the partial pressure difference across the membrane 132.

The MS-PGMD system is not limited to the configuration shown in FIG. 1A. In addition to this, in various embodiments, the modules 102 are connected in series to one or more of the lines used for fluid flow through the modules 102, such as the feed line 104 and feed return line 110, the carrier gas line 106 and the carrier gas outlet 112, and the coolant line 108 and the coolant outlet line 114. These configurations are discussed with respect to FIGS. 1B-1H.

Figure 1B:
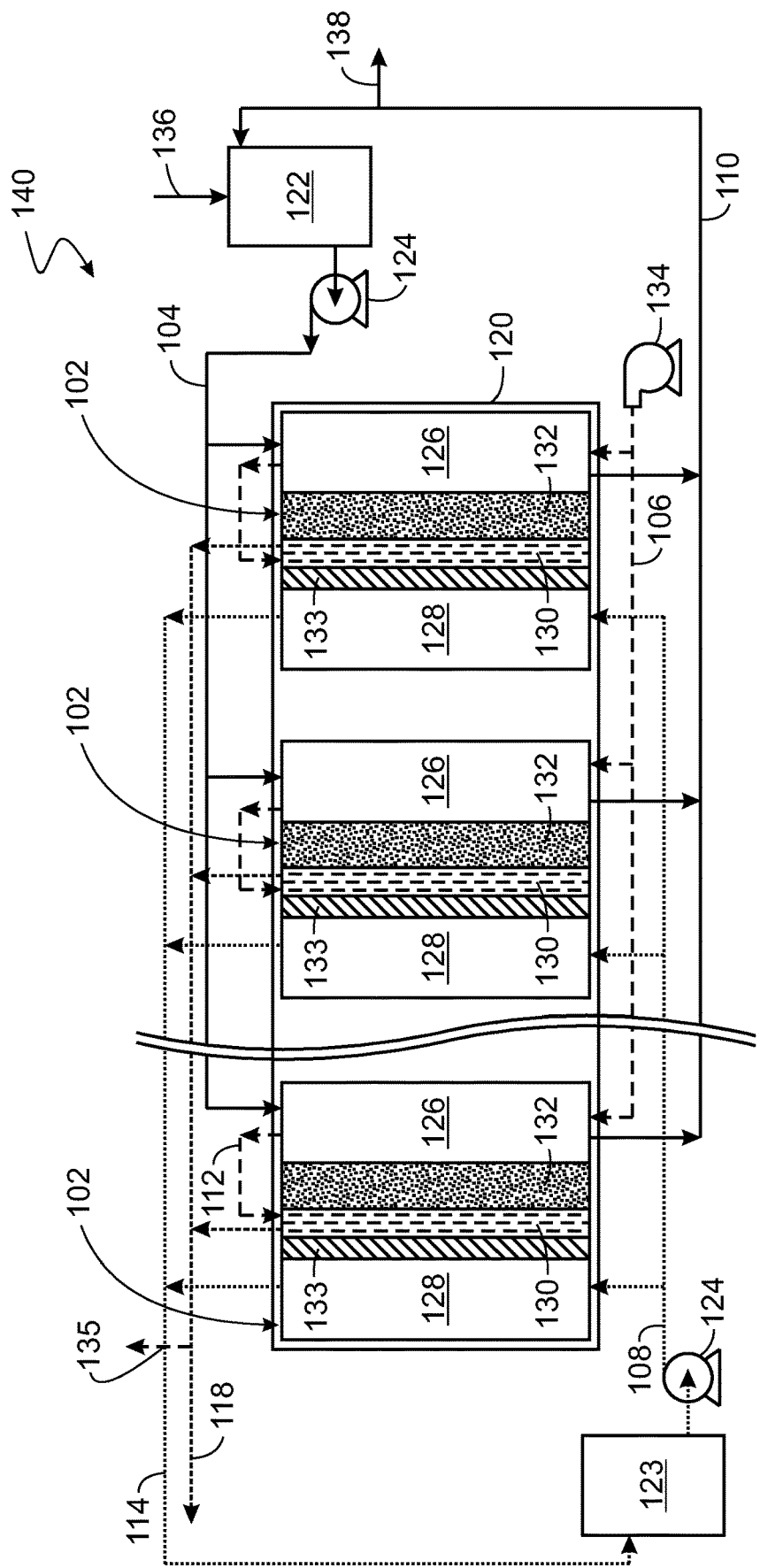
FIG. 1B is a simplified process flow diagram of a MS-PGMD system, wherein each of the modules is fluidly connected in parallel to a feed line, a carrier gas line, and a coolant line.

FIG. 1B is a simplified process flow diagram a MS-PGMD system 140, wherein the modules 102 are connected in parallel to the feed line 104, the feed return line 110, the carrier gas line 106, and the carrier gas outlet line 112, the coolant line 108, and the coolant outlet line 114. In this embodiment, the feed line 104, the feed return line 110, the carrier gas line 106, and the carrier gas outlet line 112 are all coupled to the feed chamber 126 of each of the modules 102 in parallel. In this embodiment, the coolant line 108 and the coolant outlet line 114 are coupled to the coolant chamber 128 of each of the the modules 102 in parallel. In this embodiment, the condenser 116 is omitted, and the carrier gas exiting the feed chamber 126 of each of the modules 102 flows to the permeate gap chamber 130 of the respective module 102. A vent stream (dotted arrow) including the carrier gas can be separated from the distillate and can be vented or recycled, for example, to the blower 134.

Figure 1C:
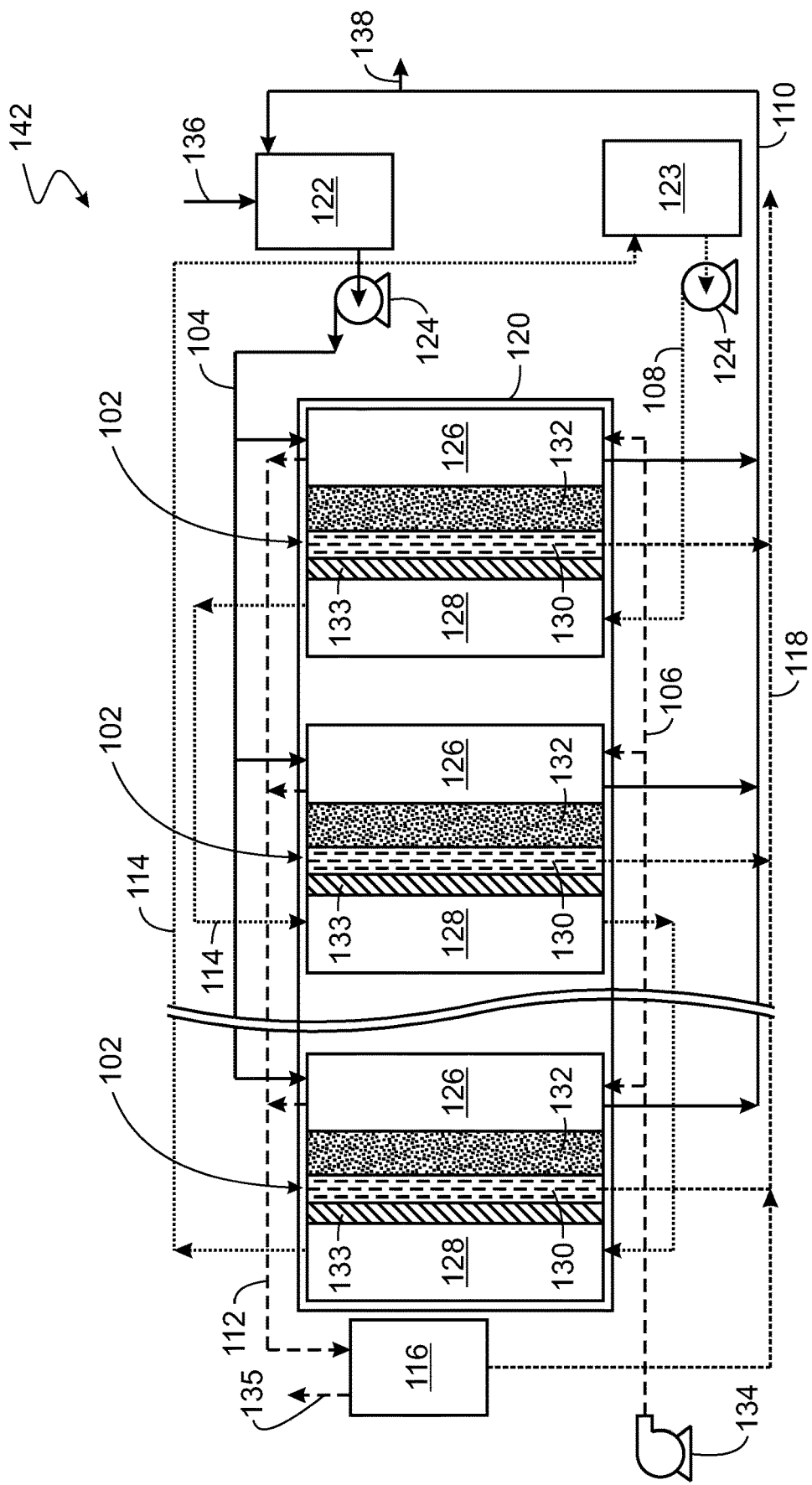
FIG. 1C is a simplified process flow diagram a MS-PGMD system including an external condenser, wherein the modules are connected in parallel to the feed line and the carrier gas line, and in series with the coolant line.

FIG. 1C is a simplified process flow diagram a MS-PGMD system 142, wherein the modules 102 are connected in parallel to the feed line 104, the feed return line 110, the carrier gas line 106, and the carrier gas outlet line 112, and in series with the coolant line 108 and the coolant outlet line 114. In this embodiment, the feed line 104, the feed return line 110, the carrier gas line 106, and the carrier gas outlet line 112 are all coupled to the feed chamber 126 of each of the modules 102 in parallel. In this embodiment, the coolant line 108 and the coolant outlet line 114 are coupled to the coolant chambers 128 of the modules 102 in series. In this embodiment, the condenser 116 is included for condensing the carrier gas exiting the feed chambers 126 of the modules 102 to produce additional distillate.

Figure 1D:
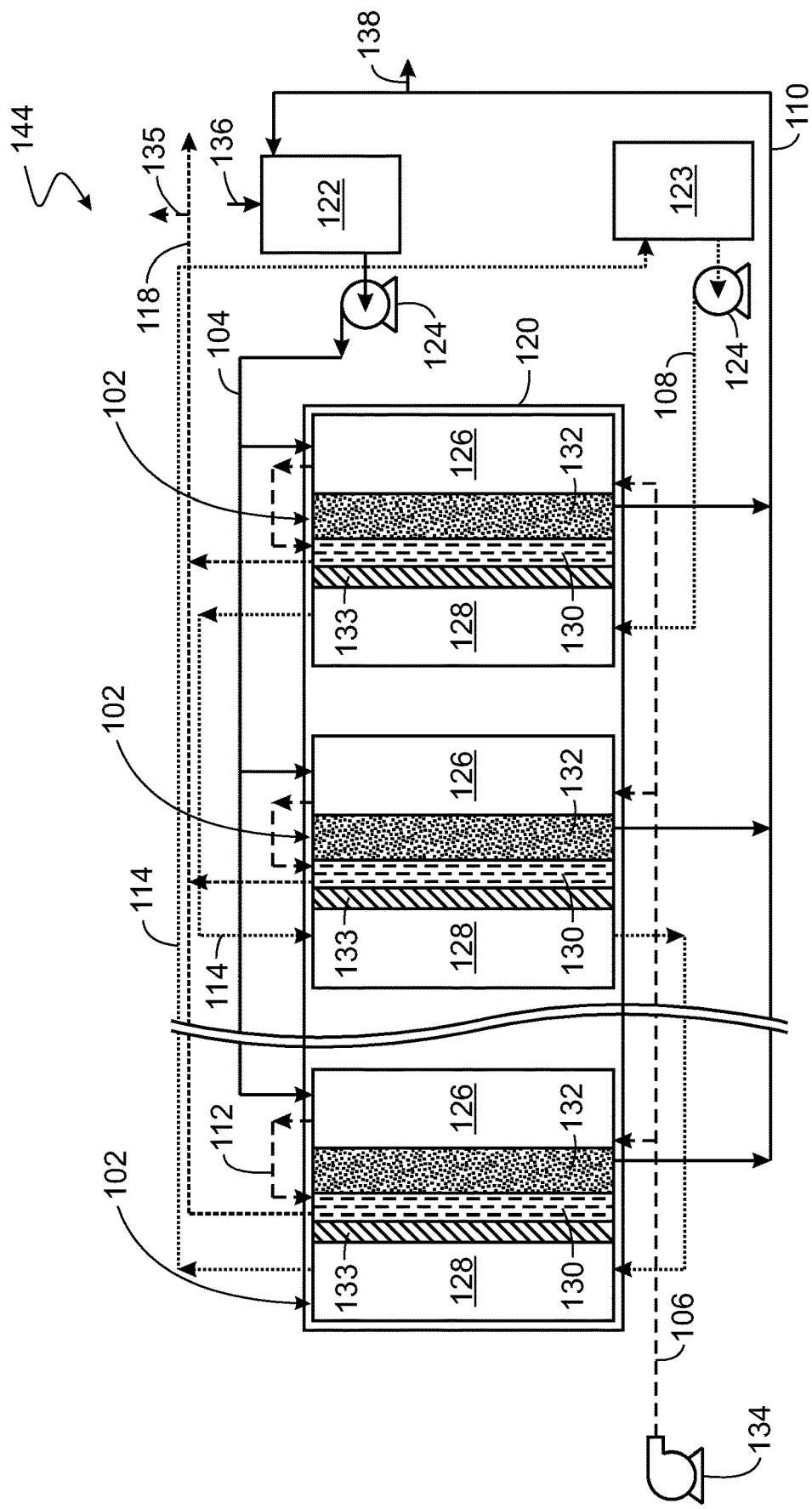
FIG. 1D is a simplified process flow diagram of a MS-PGMD system, wherein the modules are connected in parallel to the feed line and the carrier gas line, and in series with the coolant line.

FIG. 1D is a simplified process flow diagram a MS-PGMD system 144, wherein the modules 102 are connected in parallel to the feed line 104, the feed return line 110, the carrier gas line 106, and the carrier gas outlet line 112, and in series with the coolant line 108 and the coolant outlet line 114. In this embodiment, the feed line 104, the feed return line 110, the carrier gas line 106, and the carrier gas outlet line 112 are all coupled to the feed chamber 126 of each of the modules 102 in parallel. In this embodiment, the coolant line 108 and the coolant outlet line 114 are coupled to the coolant chambers 128 of the modules 102 in series. In this embodiment, the condenser 116 is omitted, and the carrier gas exiting the feed chamber 126 of each of the modules 102 flows to the permeate gap chamber 130 of the respective module 102. A vent stream (dotted arrow) including the carrier gas can be separated from the distillate and can be vented or recycled, for example, to the blower 134.

Figure 1E:
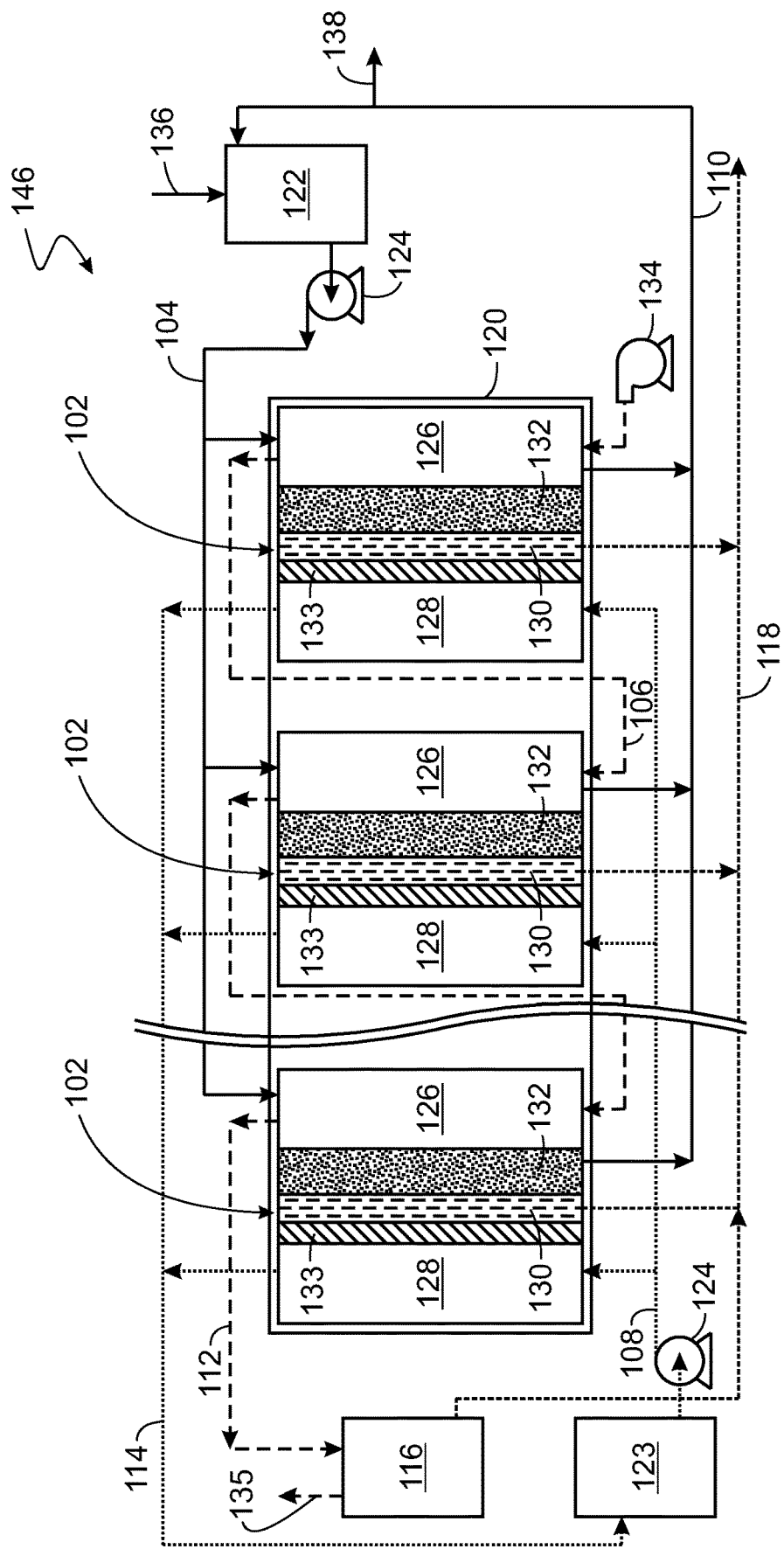
FIG. 1E is a simplified process flow diagram of a MS-PGMD including an external condenser, wherein the modules are connected in parallel to the feed line and the coolant line, and in series with the carrier gas line.

FIG. 1E is a simplified process flow diagram of a MS-PGMD 146, wherein the modules 102 are connected in parallel to the feed line 104, the feed return line 110, the coolant line 108, and the coolant outlet line 114, and in series with the carrier gas line 106 and the carrier gas outlet line 112. In this embodiment, the feed line 104 and the feed return line 110 are coupled to the feed chamber 126 of each of the modules 102 in parallel. In this embodiment, the coolant line 108 and the coolant outlet line 114 are coupled to the coolant chamber 128 of each of the modules 102 in parallel. In this embodiment, the carrier gas line 106 and the carrier gas outlet line 112 are coupled to the feed chambers 126 of the modules 102 in series. In this embodiment, the condenser 116 is included for condensing the carrier gas exiting the feed chamber 126 of the last module of the plurality of modules 102 to produce additional distillate.

Figure 1F:
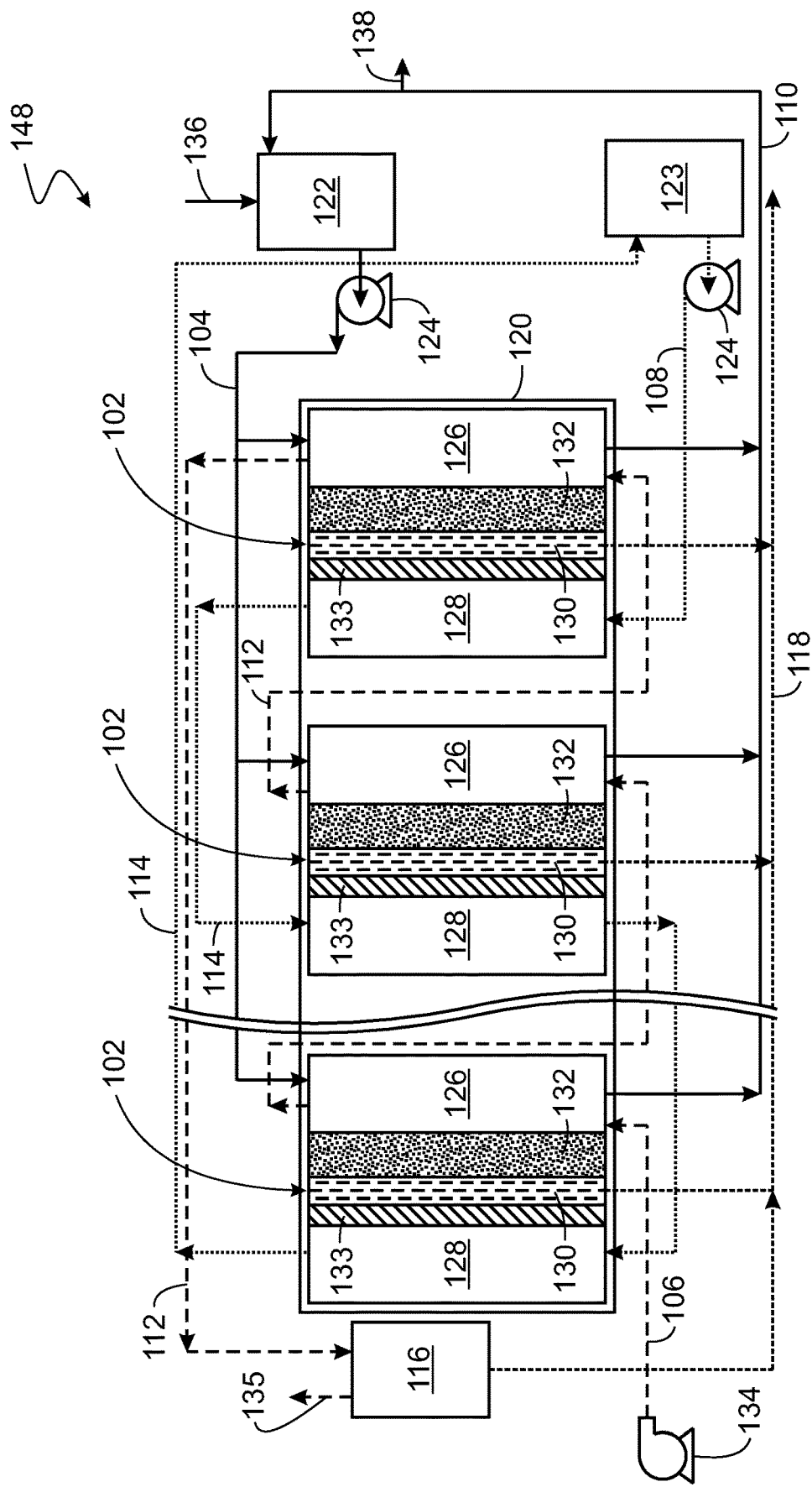
FIG. 1F is a simplified process flow diagram of a MS-PGMD system including an external condenser, wherein the modules are connected in parallel to the feed line, and in series with the carrier gas line and the coolant line.

FIG. 1F is a simplified process flow diagram of a MS-PGMD system 148, wherein the modules 102 are connected in parallel to the feed line 104 and the feed return line 110, and in series with the carrier gas line 106, the carrier gas outlet line 112, the coolant line 108, and the coolant outlet line 114. In this embodiment, the feed line 104 and the feed return line 110 are coupled to the feed chamber 126 of each of the modules 102 in parallel. In this embodiment, the carrier gas line 106 and the carrier gas outlet line 112 are coupled to the feed chambers 126 of the modules 102 in series. In this embodiment, the coolant line 108 and the coolant outlet line 114 are coupled to the coolant chambers 128 of the modules 102 in series. In this embodiment, the condenser 116 is included for condensing the carrier gas exiting the feed chamber 126 of the last module of the plurality of modules 102 to produce additional distillate.

Figure 1G:
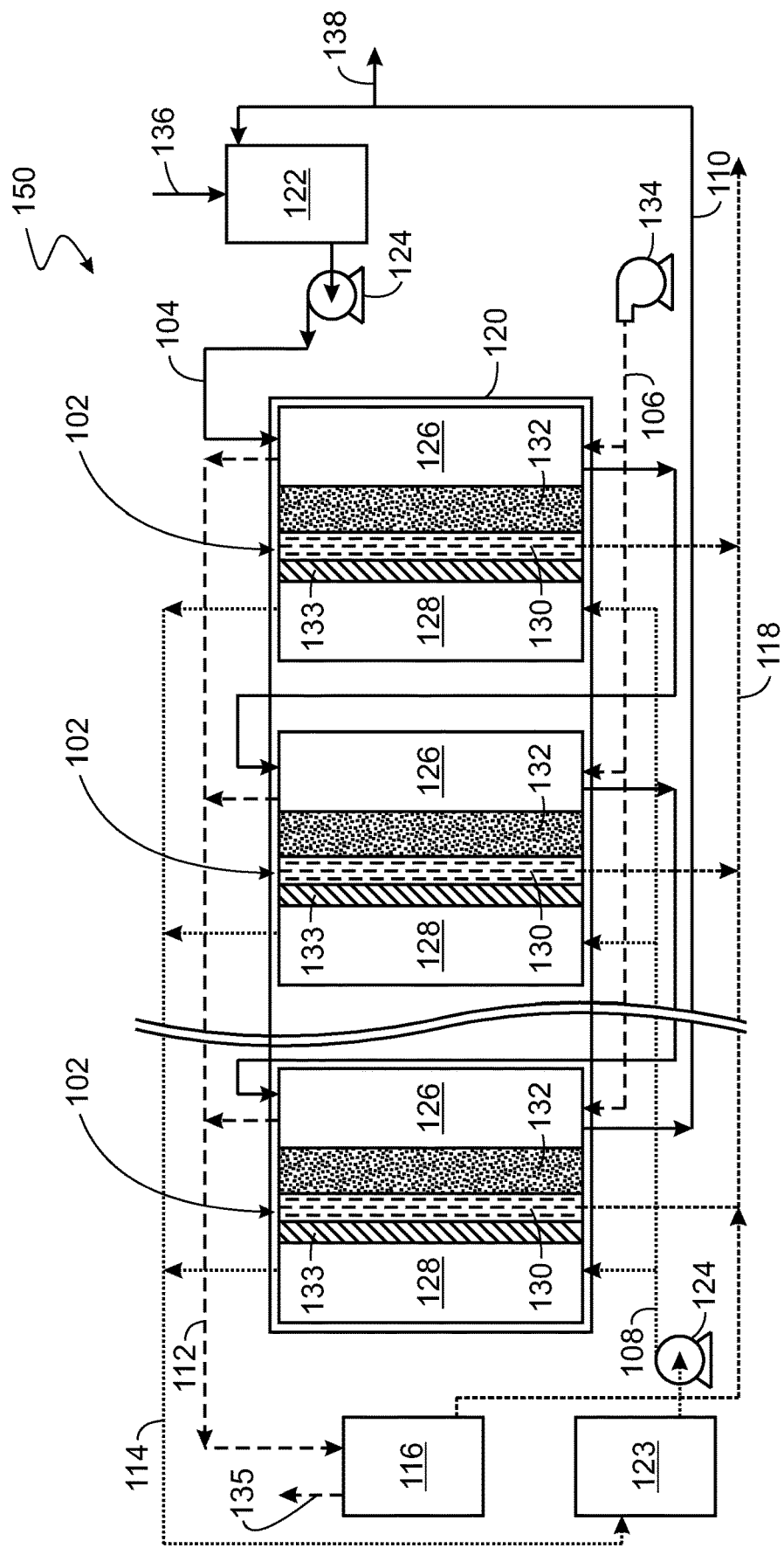
FIG. 1G is a simplified process flow diagram of a MS-PGMD system including an external condenser, wherein the modules are coupled in series to the feed line, and in parallel to the carrier gas line and the coolant line.

FIG. 1G is a simplified process flow diagram of a MS-PGMD system 150, wherein the modules 102 are coupled in series to the feed line 104 and the feed return line 110, and in parallel to the carrier gas line 106, the carrier gas outlet line 112, the coolant line 108, and the coolant outlet line 114. In this embodiment, the feed line 104 and the feed return line 110 are coupled to the feed chambers 126 of the modules 102 in series. In this embodiment, the carrier gas line 106 and the carrier gas outlet line 112 are coupled to the feed chamber 126 of each of the modules 102 in parallel. In this embodiment, the coolant line 108 and the coolant outlet line 114 are coupled to the coolant chamber 128 of each of the modules 102 in parallel. In this embodiment, the condenser 116 is included for condensing the carrier gas exiting the feed chambers 126 of the modules 102 to produce additional distillate.

Figure 1H:
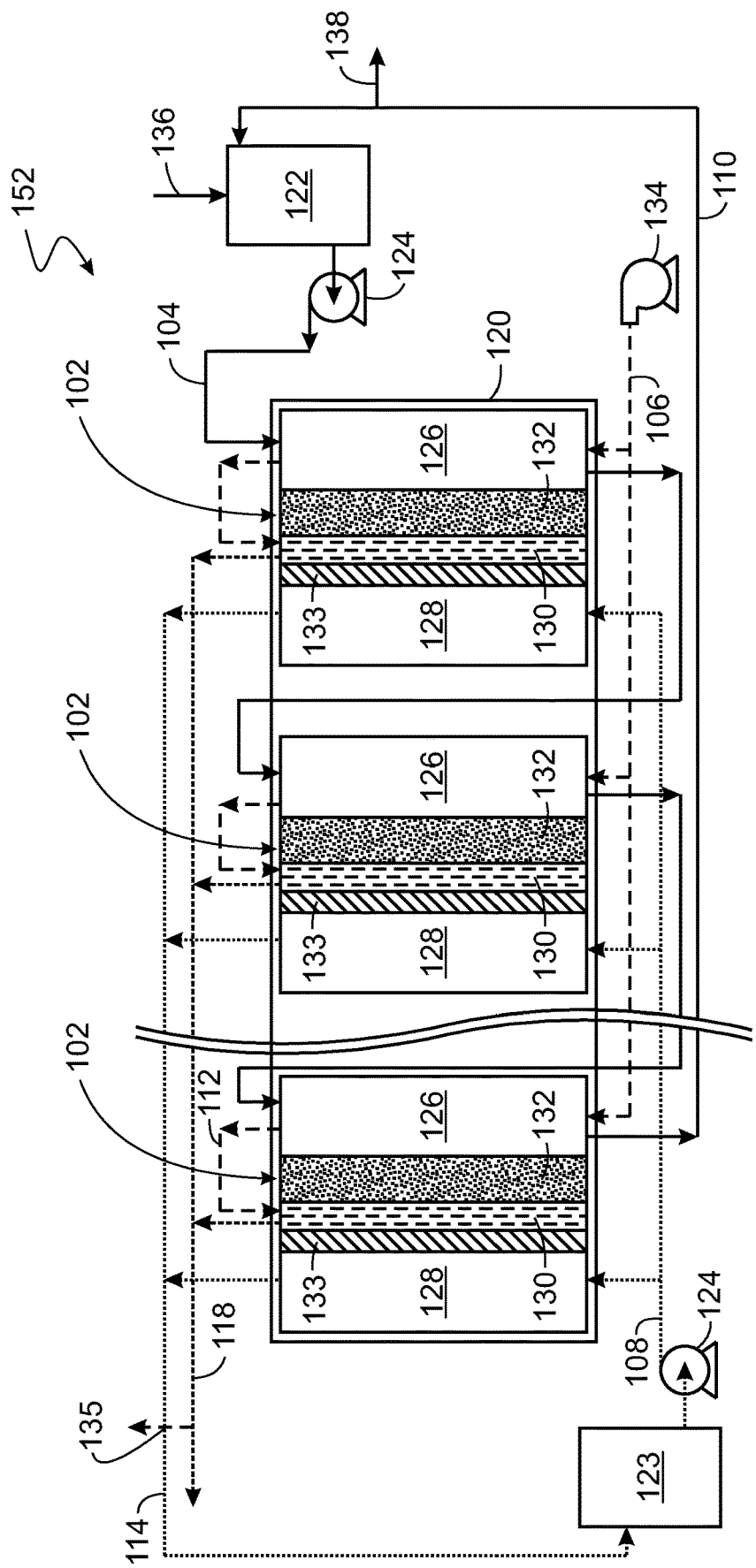
FIG. 1H is a simplified process flow diagram of a MS-PGMD system, wherein the modules are coupled in series to the feed line, and in parallel to the carrier gas line and the coolant line.

FIG. 1H is a simplified process flow diagram of a MS-PGMD system 152, wherein the modules 102 are coupled in series to the feed line 104 and the feed return line 110, and in parallel to the carrier gas line 106, the carrier gas outlet line 112, the coolant line 108, and the coolant outlet line 114. In this embodiment, the feed line 104 and the feed return line 110 are coupled to the feed chambers 126 of the modules 102 in series. In this embodiment, the carrier gas line 106 and the carrier gas outlet line 112 are coupled to the feed chamber 126 of each of the modules 102 in parallel. In this embodiment, the coolant line 108 and the coolant outlet line 114 are coupled to the coolant chamber 128 of each of the modules 102 in parallel. In this embodiment, the condenser 116 is omitted, and the carrier gas exiting the feed chamber 126 of each of the modules 102 flows to the permeate gap chamber 130 of the respective module 102. A vent stream (dotted arrow) including the carrier gas can be separated from the distillate and can be vented or recycled, for example, to the blower 134.

Figure 1I:
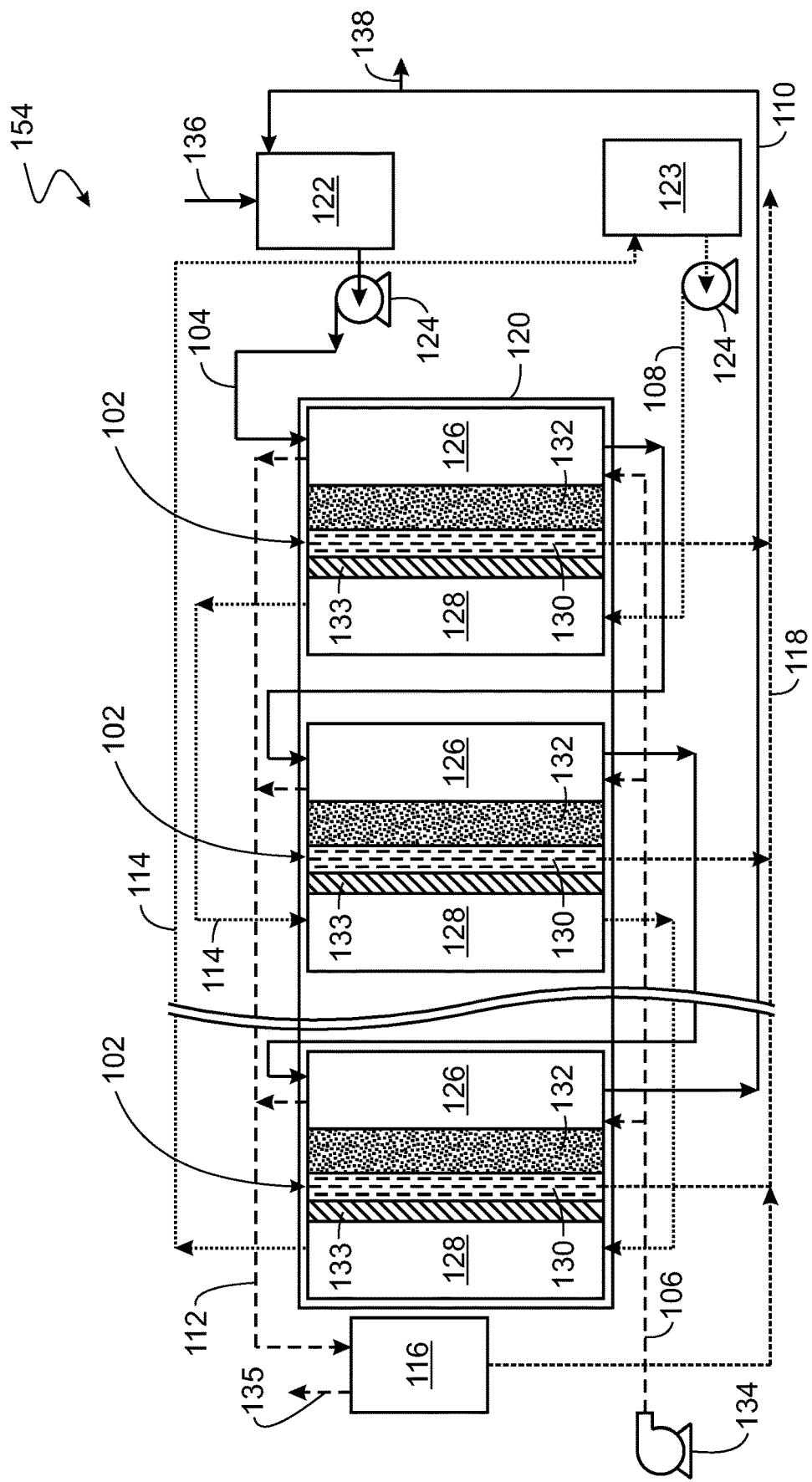
FIG. 1I is a simplified process flow diagram of a MS-PGMD system including an external condenser, wherein the modules are coupled in series to the feed line and the coolant line, and in parallel to the carrier gas line.

FIG. 1I is a simplified process flow diagram of a MS-PGMD system 154, wherein the modules 102 are coupled in series to the feed line 104, the feed return line 110, the coolant line 108, and the coolant outlet line 114, and in parallel to the carrier gas line 106 and the carrier gas outlet line 112. In this embodiment, the feed line 104 and the feed return line 110 are coupled to the feed chambers 126 of the modules 102 in series. In this embodiment, the carrier gas line 106 and the carrier gas outlet line 112 are coupled to the feed chamber 126 of each of the modules 102 in parallel. In this embodiment, the coolant line 108 and the coolant outlet line 114 are coupled to the coolant chambers 128 of the modules 102 in series. In this embodiment, the condenser 116 is included for condensing the carrier gas exiting the feed chambers 126 of the modules 102 to produce additional distillate.

Figure 1J:
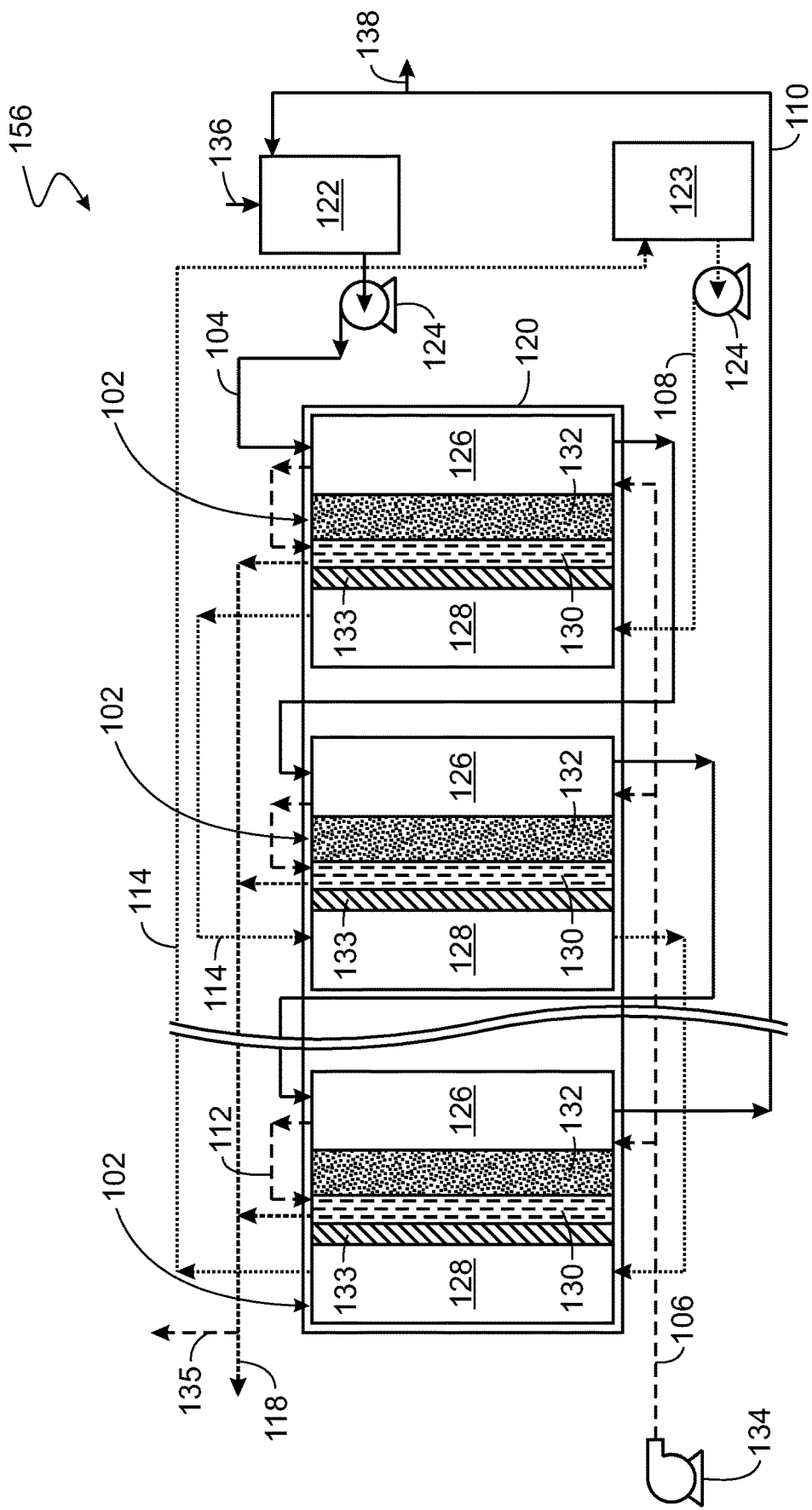
FIG. 1J is a simplified process flow diagram of a MS-PGMD system, wherein the modules are coupled in series to the feed line and the coolant line, and in parallel to the carrier gas line.

FIG. 1J is a simplified process flow diagram of a MS-PGMD system 156, wherein the modules 102 are coupled in series to the feed line 104, the feed return line 110, the coolant line 108, and the coolant outlet line 114, and in parallel to the carrier gas line 106 and the carrier gas outlet line 112. In this embodiment, the feed line 104 and the feed return line 110 are coupled to the feed chambers 126 of the modules 102 in series. In this embodiment, the carrier gas line 106 and the carrier gas outlet line 112 are coupled to the feed chamber 126 of each of the modules 102 in parallel. In this embodiment, the coolant line 108 and the coolant outlet line 114 are coupled to the coolant chambers 128 of the modules 102 in series. In this embodiment, the condenser 116 is omitted, and the carrier gas exiting the feed chamber 126 of each of the modules 102 flows to the permeate gap chamber 130 of the respective module 102. A vent stream (dotted arrow) including the carrier gas can be separated from the distillate and can be vented or recycled, for example, to the blower 134.

Figure 1K:
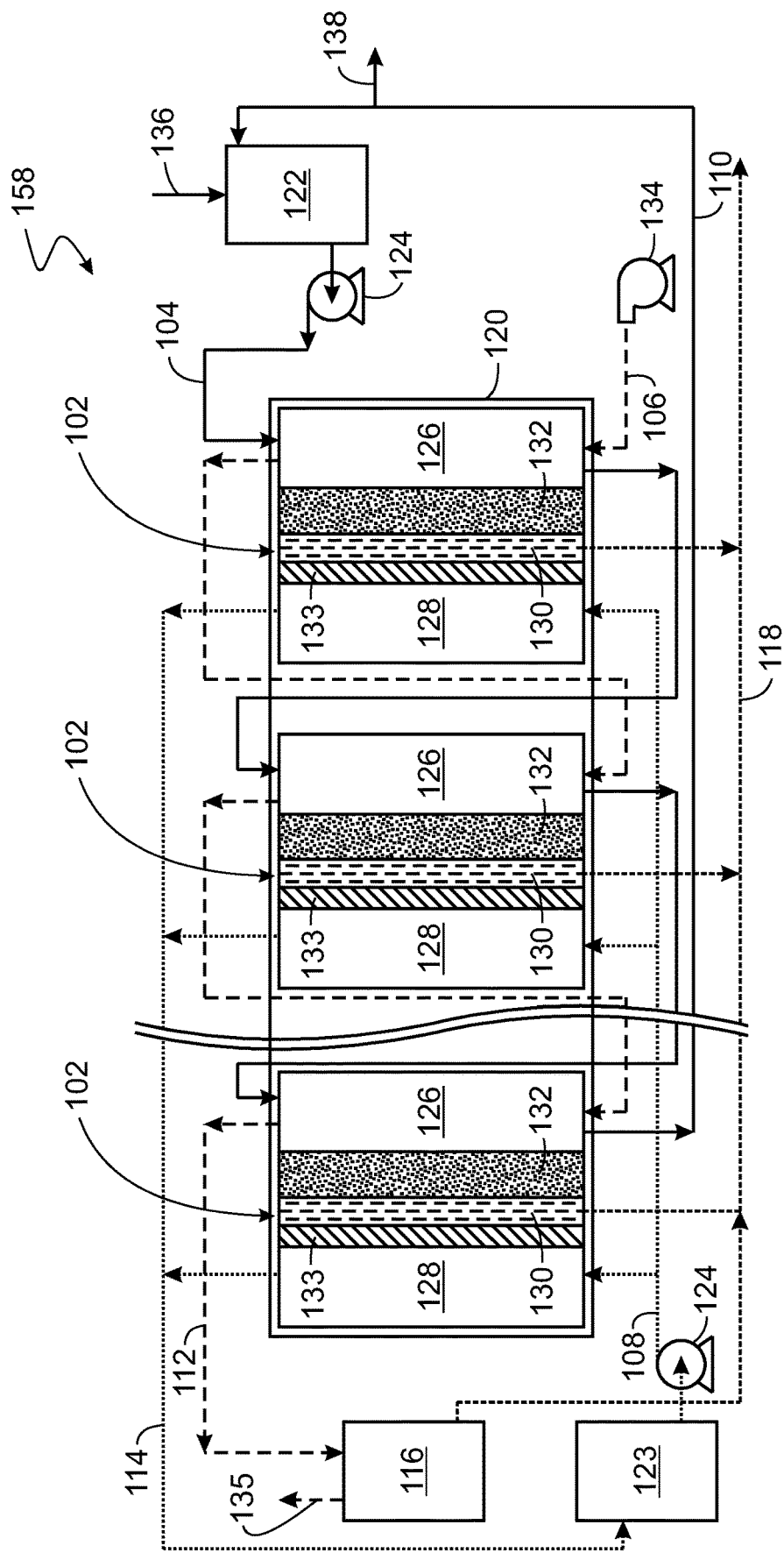
FIG. 1K is a simplified process flow diagram a MS-PGMD system including an external condenser, wherein the modules are coupled in series to the feed line and the carrier gas line, and in parallel to the coolant line.

FIG. 1K is a simplified process flow diagram a MS-PGMD system 158, wherein the modules 102 are coupled in series to the feed line 104, the feed return line 110, the carrier gas line 106, and the carrier gas outlet line 112, and in parallel to the coolant line 108 and the coolant outlet line 114. In this embodiment, the feed line 104 and the feed return line 110 are coupled to the feed chambers 126 of the modules 102 in series. In this embodiment, the carrier gas line 106 and the carrier gas outlet line 112 are coupled to the feed chambers 126 of the modules 102 in series. In this embodiment, the coolant line 108 and the coolant outlet line 114 are coupled to the coolant chamber 128 of each of the modules 102 in parallel. In this embodiment, the condenser 116 is included for condensing the carrier gas exiting the feed chamber 126 of the last module of the plurality of modules 102 to produce additional distillate.

Figure 1L:
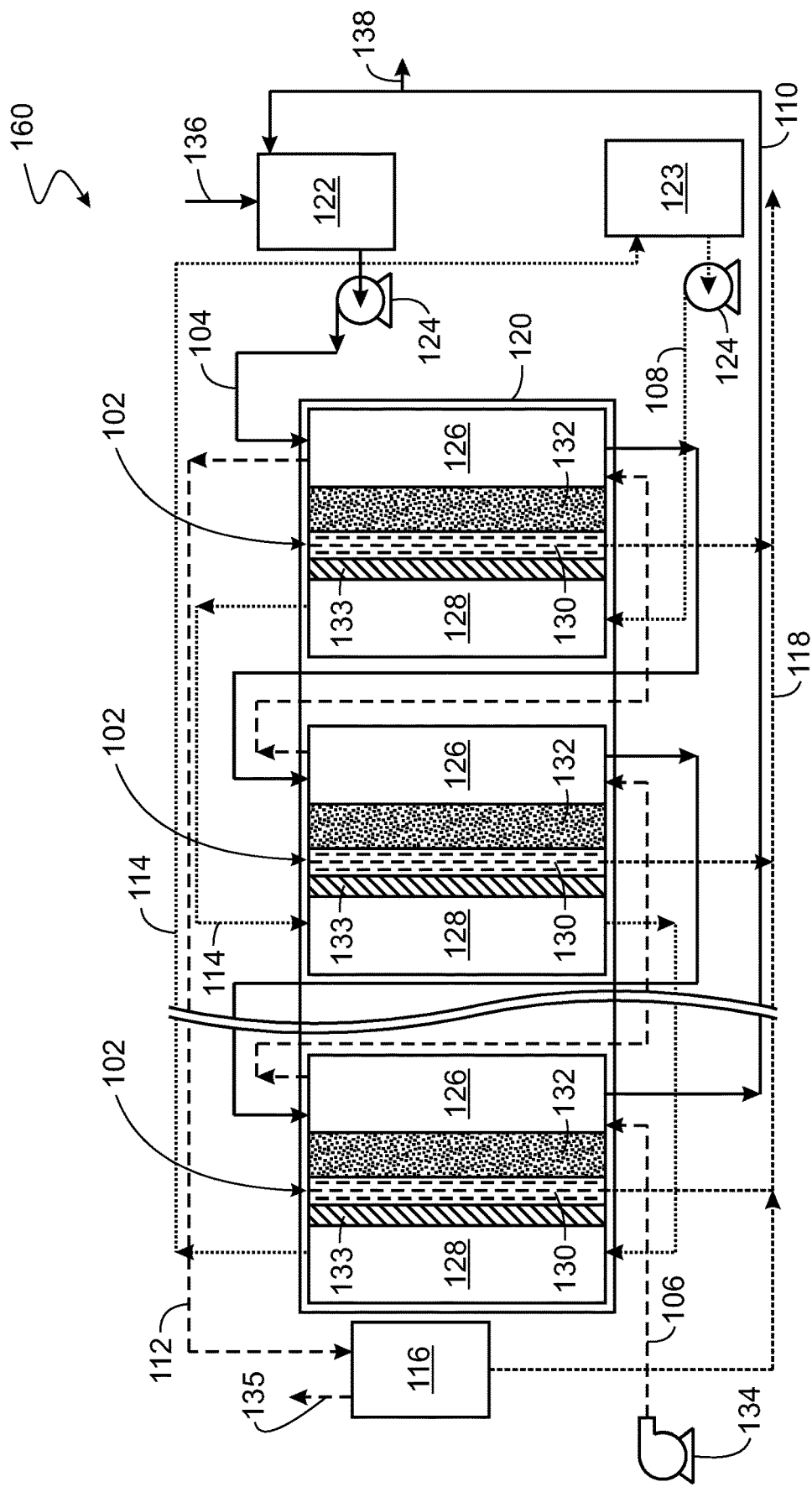
FIG. 1L is a simplified process flow diagram of a MS-PGMD system including an external condenser, wherein the modules are coupled in series to the feed line, the carrier gas line, and the coolant line.

FIG. 1L is a simplified process flow diagram of a MS-PGMD system 160, wherein the modules 102 are coupled in series to the feed line 104, the feed return line 110, the carrier gas line 106, the carrier outlet gas line 112, the coolant line 108, and the coolant outlet line 114. In this embodiment, the feed line 104 and the feed return line 110 are coupled to the feed chambers 126 of the modules 102 in series. In this embodiment, the carrier gas line 106 and the carrier gas outlet line 112 are coupled to the feed chambers 126 of the modules 102 in series. In this embodiment, the coolant line 108 and the coolant outlet line 114 are coupled to the coolant chambers 128 of the modules 102 in series. In this embodiment, the condenser 116 is included for condensing the carrier gas exiting the feed chamber 126 of the last module of the plurality of modules 102 to produce additional distillate.

Figure 2:
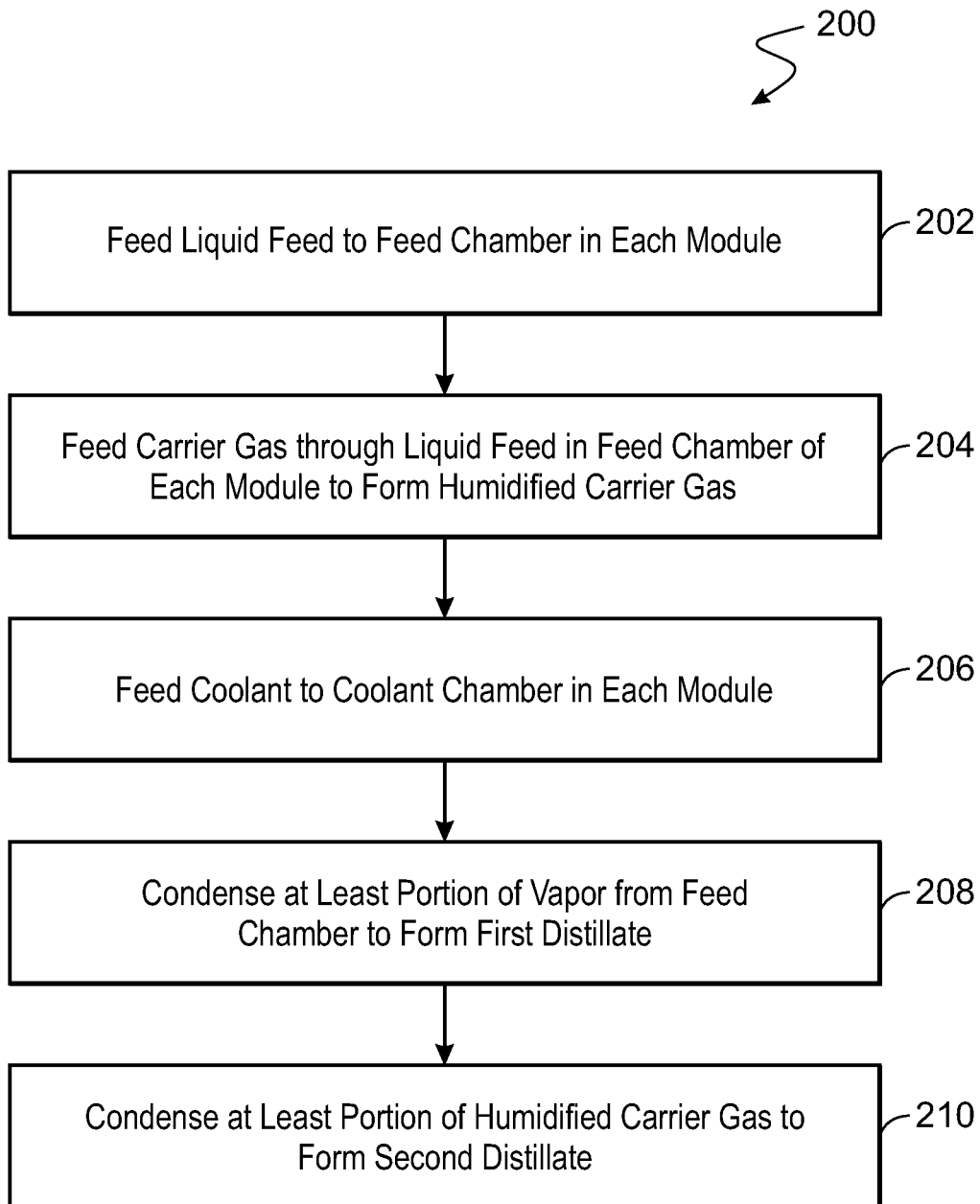
FIG. 2 is a process flow diagram of a method for purifying a liquid feed using a MS-PGMD system.

FIG. 2 is a process flow diagram of a method 200 for purifying a liquid feed using a MS-PGMD system. The method 200 begins at block 202 when a liquid feed is fed to a feed chamber (such as the feed chamber 126) in each of a plurality of modules (102). The liquid feed in the feed chamber 126 is at a temperature of greater than about 50° C. The liquid feed can be heated before it is fed to the feed chamber 126, or the liquid feed can be heated in the feed chamber 126. In some embodiments, the liquid feed is fed to a feed chamber 126 of a first module of the plurality of modules 102, and the liquid exiting the feed chamber 126 of the first module of the plurality of modules 102 is then fed to a feed chamber 126 of a second module of the plurality of modules 102.

At block 204, a carrier gas is fed through the liquid feed in the feed chamber 126 of each of the plurality of modules 102 to form humidified carrier gas. In some embodiments, the carrier gas is fed to a feed chamber 126 of a first module of the plurality of modules 102, and then the carrier gas exiting the feed chamber 126 of the first module of the plurality of modules 102 is fed to a feed chamber 126 of a second module of the plurality of modules 102.

At block 206, a coolant is fed to a coolant chamber (such as the coolant chamber 128) of each of the plurality of modules 102. The coolant chamber 128 in each module 102 is separated from the feed chamber 126 in each module 102 by a permeate gap chamber 130. The permeate gap chamber 130 is substantially filled with a liquid that includes water. The permeate gap chamber 130 in each module 102 is separated from the feed chamber 126 in each module 102 by a membrane (such as the membrane 132), and wherein the membrane 132 allows vapor to pass across the membrane 132 while blocking liquid flow across the membrane 132. The coolant chamber 128 in each module 102 is separated from the permeate gap chamber 130 in each module 102 by a thermally conductive plate (such as the thermally conductive plate 133). In some embodiments, the coolant is fed to the coolant chamber 128 of a first module of the plurality of modules 102, and then the coolant exiting the coolant chamber 128 of the first module of the plurality of modules 102 is fed to a coolant chamber 128 of a second module of the plurality of modules 102.

At block 208, at least a portion of the vapor from the feed chamber 126 that transported through the membrane 132 is condensed by the coolant in the coolant chamber 128 to form a first distillate. At block 210, at least a portion of the humidified carrier gas is condensed (for example, by the external condenser 116) to form a second distillate. In some embodiments, the first distillate and the second distillate are combined.

The details of one or more embodiments of the subject matter of this disclosure are set forth in the accompanying drawings and the description. Other features, aspects, and advantages of the subject matter will become apparent from the description, the drawings, and the claims.

EMBODIMENTS

In a first embodiment, a multistage permeate gap membrane distillation (MS-PGMD) system includes multiple modules. Each module includes a feed chamber, a coolant chamber, a permeate gap chamber, a membrane, and a thermally conductive plate. The feed chamber of each module is coupled to a feed line and a carrier gas line. The feed line introduces a liquid feed into the feed chamber of each module from a liquid feed tank. The carrier gas line introduces a carrier gas into the feed chamber of each module. The coolant chamber of each module is coupled to a coolant line. The coolant line introduces a coolant into the coolant chamber of each module from a coolant feed tank. The permeate gap chamber of each module is intermediate of the feed chamber and the coolant chamber of the respective module. The permeate gap chamber of each module is substantially filled with a liquid including water. The membrane of each module separates the feed chamber from the permeate gap chamber of the respective module. The membrane of each module allows transportation of vapor from the feed chamber to the permeate gap chamber of the respective module while blocking liquid from moving from the feed chamber to the permeate gap chamber of the respective module. The thermally conductive plate of each module separates the coolant chamber from the permeate gap chamber of the respective module. The thermally conductive plate of each module and the coolant within the coolant chamber of the respective module are cooperatively configured to condense at least a portion of the vapor from the feed chamber that transported through the membrane of the respective module to form a distillate.

The foregoing and other described embodiments can each, optionally, include one or more of the following features.

A first feature, combinable with any of the following features, in which the MS-PGMD system includes a condenser that is fluidically coupled to the feed chamber of each module and the condenser is configured to condense at least a portion of a vapor exiting the feed chamber of each module to form a second distillate.

A second feature, combinable with any of the previous or following features, in which the MS-PGMD system includes a carrier gas outlet line that fluidically couples a carrier gas outlet on the feed chamber of each module to the condenser.

A third feature, combinable with any of the previous or following features, in which the modules are coupled in parallel to the feed line, the carrier gas line, and the coolant line.

A fourth feature, combinable with any of the previous or following features, in which the modules are fluidically coupled in series to the liquid feed, a liquid inlet to the feed chamber of a first module in the series is fluidically coupled to the feed line, a liquid outlet of the feed chamber of a last module in the series is fluidically coupled to a feed return line, and each intervening module between the first module and the last module is fluidically coupled by a line from a liquid outlet on the feed chamber of the intervening module to a liquid inlet on the feed chamber of the next module.

A fifth feature, combinable with any of the previous or following features, in which the modules are fluidically coupled in series to the coolant, a coolant inlet to the coolant chamber of a first module in the series is fluidically coupled to the coolant line, a coolant outlet of the coolant chamber of a last module in the series is fluidically coupled to a coolant return line, and each intervening module between the first module and the last module is fluidically coupled by a line from a coolant outlet of the coolant chamber of the intervening module to a coolant inlet of the coolant chamber of the next module.

A sixth feature, combinable with any of the previous or following features, in which the modules are fluidically coupled in series to the carrier gas, a carrier gas inlet to the feed chamber of a first module in the series is fluidically coupled to the carrier gas line, a carrier gas outlet of the feed chamber of a last module in the series is fluidically coupled to a carrier gas outlet line, and each intervening module between the first module and the last module is fluidically coupled by a line from a carrier gas outlet of the feed chamber of the intervening module to a carrier gas inlet of the feed chamber of the next module.

A seventh feature, combinable with any of the previous or following features, in which the MS-PGMD system includes a heating element coupled to the liquid feed tank.

An eighth feature, combinable with any of the previous or following features, in which the MS-PGMD system includes a heat exchanger coupled to the feed line.

A ninth feature, combinable with any of the previous or following features, in which the MS-PGMD system includes a heating element coupled to the feed chamber of at least one of the modules.

A tenth feature, combinable with any of the previous or following features, in which the MS-PGMD system includes a heating element coupled to the carrier gas line.

An eleventh feature, combinable with any of the previous or following features, in which the liquid feed includes an aqueous solution.

A twelfth feature, combinable with any of the previous or following features, in which the liquid feed includes a liquid including a dissolved salt, a mixture of salts, a salt and an organic contaminant mixture, or a salt and an inorganic contaminant mixture, or any combinations thereof.

A thirteenth feature, combinable with any of the previous or following features, in which the liquid feed includes seawater, industrial wastewater, brackish water, produced water, fruit juice, blood, milk, dye, hazardous wastewater, or a brine solution, or any combinations thereof.

A fourteenth feature, combinable with any of the previous or following features, in which the membrane includes a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane, or any combinations thereof.

A fifteenth feature, combinable with any of the previous or following features, in which the membrane includes a reinforced hollow tube, a non-reinforced hollow tube, a spiral wound, a flat sheet, or a non-flat sheet, or any combinations thereof.

A sixteenth feature, combinable with any of the previous or following features, in which a contact angle of a condensed droplet on the membrane is greater than 90° (degrees).

A seventeenth feature, combinable with any of the previous features, in which the carrier gas includes air, nitrogen, helium, argon, or carbon dioxide, or any combinations thereof.

In a second embodiment, a method for purifying a liquid using a multi-stage permeate gap membrane distillation (MS-PGMD) system includes feeding a liquid feed to a feed chamber in each of multiple modules. The liquid feed in the feed chamber of each module is at a temperature of greater than about 50 degrees Celsius (° C.). The method includes feeding a carrier gas through the liquid feed in the feed chamber of each module to form a humidified carrier gas. The method includes feeding a coolant to a coolant chamber in each module. The coolant chamber in each module is separated from the feed chamber in each module by a permeate gap chamber that is substantially filled with a liquid that includes water. The permeate gap chamber in each module is separated from the feed chamber in each module by a membrane that allows vapor to pass across the membrane while blocking liquid flow across the membrane. The coolant chamber in each module is separated from the permeate gap chamber in each module by a thermally conductive plate. The method includes condensing, by the coolant in the coolant chamber and the thermally conductive plate of each module, at least a portion of the vapor from the feed chamber in each module that transported through the membrane of the respective module to form a first distillate. The method includes condensing at least a portion of the humidified carrier gas to form a second distillate.

The foregoing and other described embodiments can each, optionally, include one or more of the following features.

An eighteenth feature, combinable with any of the following features, in which the liquid feed in the feed chamber of each module is at a temperature in a range of from about 50° C. to about 100° C.

A nineteenth feature, combinable with any of the previous or following features, in which the liquid feed is heated before the liquid feed is fed to the feed chamber of each module.

A twentieth feature, combinable with any of the previous or following features, in which the liquid feed is heated in the feed chamber of at least one of the modules.

A twenty-first feature, combinable with any of the previous or following features, in which the liquid feed is fed to the feed chamber of a first module, and then the liquid feed exiting the feed chamber of the first module is fed to the feed chamber of a second module.

A twenty-second feature, combinable with any of the previous or following features, in which the coolant is fed to the coolant chamber of a first module, and then the coolant exiting the coolant chamber of the first module is fed to the coolant chamber of a second module.

A twenty-third feature, combinable with any of the previous features, in which the carrier gas is fed to the feed chamber of a first module, and then the carrier gas exiting the feed chamber of the first module is fed to the feed chamber of a second module.

Other embodiments are also within the scope of the following claims.

What is claimed is:

1. A multistage permeate gap membrane distillation (MS-PGMD) system comprising a plurality of modules, wherein each module comprises:
    a feed chamber coupled to a feed line and a carrier gas line, wherein the feed line introduces a liquid feed into the feed chamber from a liquid feed tank, and wherein the carrier gas line introduces a carrier gas into the feed chamber;
    a coolant chamber coupled to a coolant line, wherein the coolant line introduces a coolant into the coolant chamber from a coolant feed tank;
    a permeate gap chamber intermediate of the feed chamber and the coolant chamber, the permeate gap chamber substantially filled with a liquid comprising water, wherein a width of the permeate gap chamber is non-uniform;
    a membrane separating the feed chamber from the permeate gap chamber, wherein the membrane allows transportation of vapor from the feed chamber to the permeate gap chamber while blocking liquid from moving from the feed chamber to the permeate gap chamber; and
    a thermally conductive plate separating the coolant chamber from the permeate gap chamber, wherein the thermally conductive plate and the coolant within the coolant chamber are cooperatively configured to condense at least a portion of the vapor from the feed chamber that transported through the membrane to form a distillate, wherein:
        the plurality of modules are fluidically coupled in series to the liquid feed,
        a liquid inlet to the feed chamber of a first module in the series is fluidically coupled to the feed line,
        a liquid outlet of the feed chamber of a last module in the series is fluidically coupled to a feed return line,
        each intervening module between the first module and the last module is fluidically coupled by a line from a liquid outlet on the feed chamber of the intervening module to a liquid inlet on the feed chamber of the next module, and
        the coolant chambers of the plurality of modules are fluidically coupled in parallel.

2. The MS-PGMD system of claim 1, comprising a condenser fluidically coupled to the feed chamber, wherein the condenser condenses at least a portion of a vapor exiting the feed chamber to form a second distillate.

3. The MS-PGMD system of claim 2, comprising a carrier gas outlet line fluidically coupling a carrier gas outlet on the feed chamber to the condenser.

4. The MS-PGMD system of claim 1, wherein the plurality of modules are fluidically coupled in series to the coolant, wherein a coolant inlet to the coolant chamber of a first module in the series is fluidically coupled to the coolant line, a coolant outlet of the coolant chamber of a last module in the series is fluidically coupled to a coolant return line, and each intervening module between the first module and the last module is fluidically coupled by a line from a coolant outlet of the coolant chamber of the intervening module to a coolant inlet of the coolant chamber of the next module.

5. The MS-PGMD system of claim 3, wherein the plurality of modules are fluidically coupled in series to the carrier gas, wherein a carrier gas inlet to the feed chamber of a first module in the series is fluidically coupled to the carrier gas line, a carrier gas outlet of the feed chamber of a last module in the series is fluidically coupled to a carrier gas outlet line, and each intervening module between the first module and the last module is fluidically coupled by a line from a carrier gas outlet of the feed chamber of the intervening module to a carrier gas inlet of the feed chamber of the next module.

6. The MS-PGMD system of claim 1, comprising a heating element coupled to the liquid feed tank.

7. The MS-PGMD system of claim 1, comprising a heat exchanger coupled to the feed line.

8. The MS-PGMD system of claim 1, comprising a heating element coupled to the feed chamber of at least one of the modules.

9. The MS-PGMD system of claim 1, comprising a heating element coupled to the carrier gas line.

10. The MS-PGMD system of claim 1, wherein the membrane comprises a reinforced hollow tube, a non-reinforced hollow tube, a spiral wound 2, a flat sheet, or a non-flat sheet, or any combinations thereof.

11. The MS-PGMD system of claim 1, wherein a contact angle of a condensed droplet on the membrane is greater than 90° (degrees).

12. The MS-PGMD system of claim 1, wherein the carrier gas comprises air, nitrogen, helium, argon, or carbon dioxide, or any combinations thereof.

* * * * *